Figure 1:
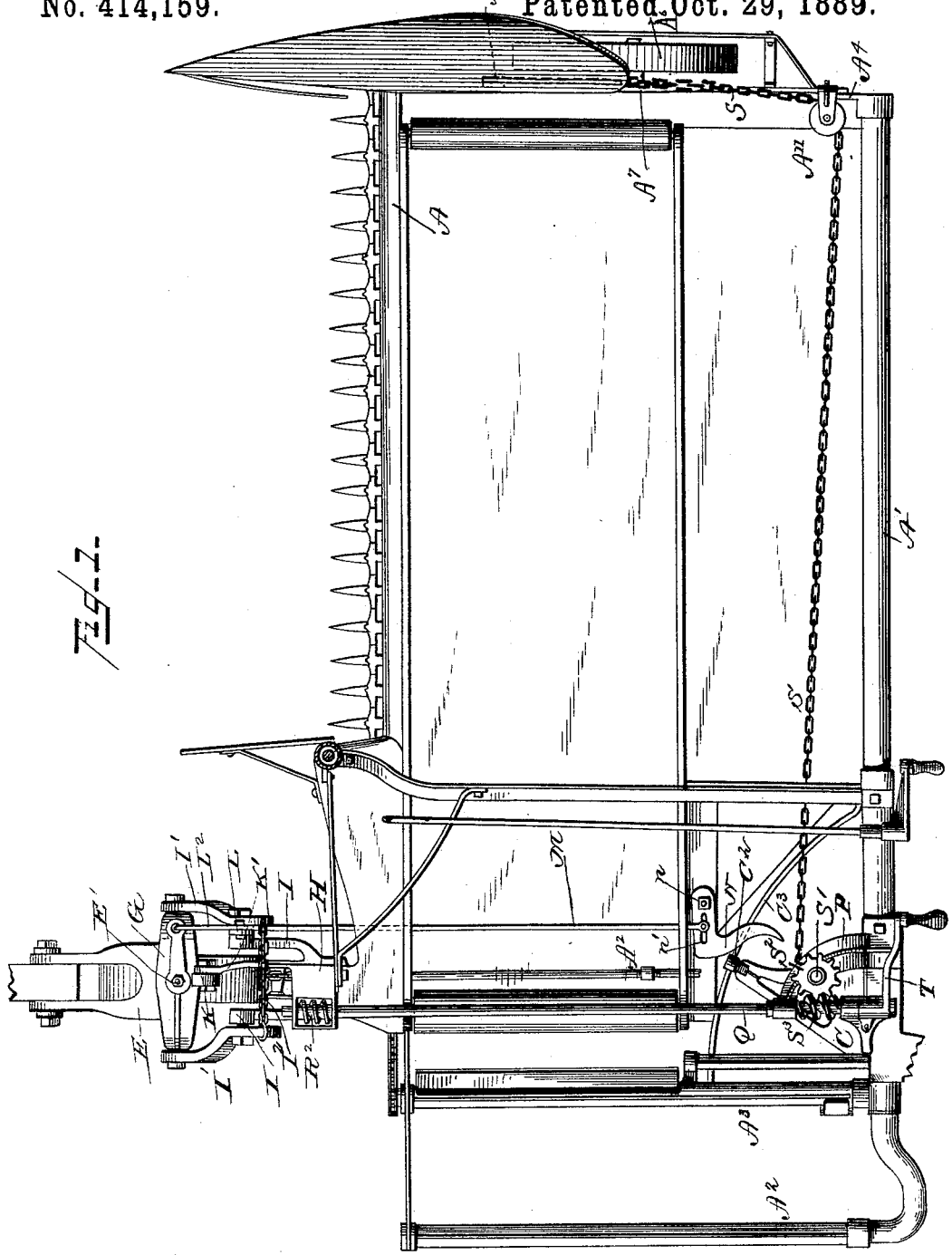

(No Model.)  7 Sheets—Sheet 3.

M. L. NICHOLS.
HARVESTER FRAME AND MEANS FOR RAISING AND LOWERING THE SAME.

No. 414,159. Patented Oct. 29, 1889.

(No Model.) 7 Sheets—Sheet 4.

M. L. NICHOLS.
HARVESTER FRAME AND MEANS FOR RAISING AND LOWERING THE SAME.

No. 414,159. Patented Oct. 29, 1889.

(No Model.) 7 Sheets—Sheet 5.

M. L. NICHOLS.
HARVESTER FRAME AND MEANS FOR RAISING AND LOWERING THE SAME.

No. 414,159. Patented Oct. 29, 1889.

WITNESSES
F. L. Durand.
T. M. Sterling

INVENTOR
Marion L. Nichols
by Alex Mahon
Attorney (No Model.) 7 Sheets—Sheet 6.
M. L. NICHOLS.
HARVESTER FRAME AND MEANS FOR RAISING AND LOWERING THE SAME.
No. 414,159. Patented Oct. 29, 1889.
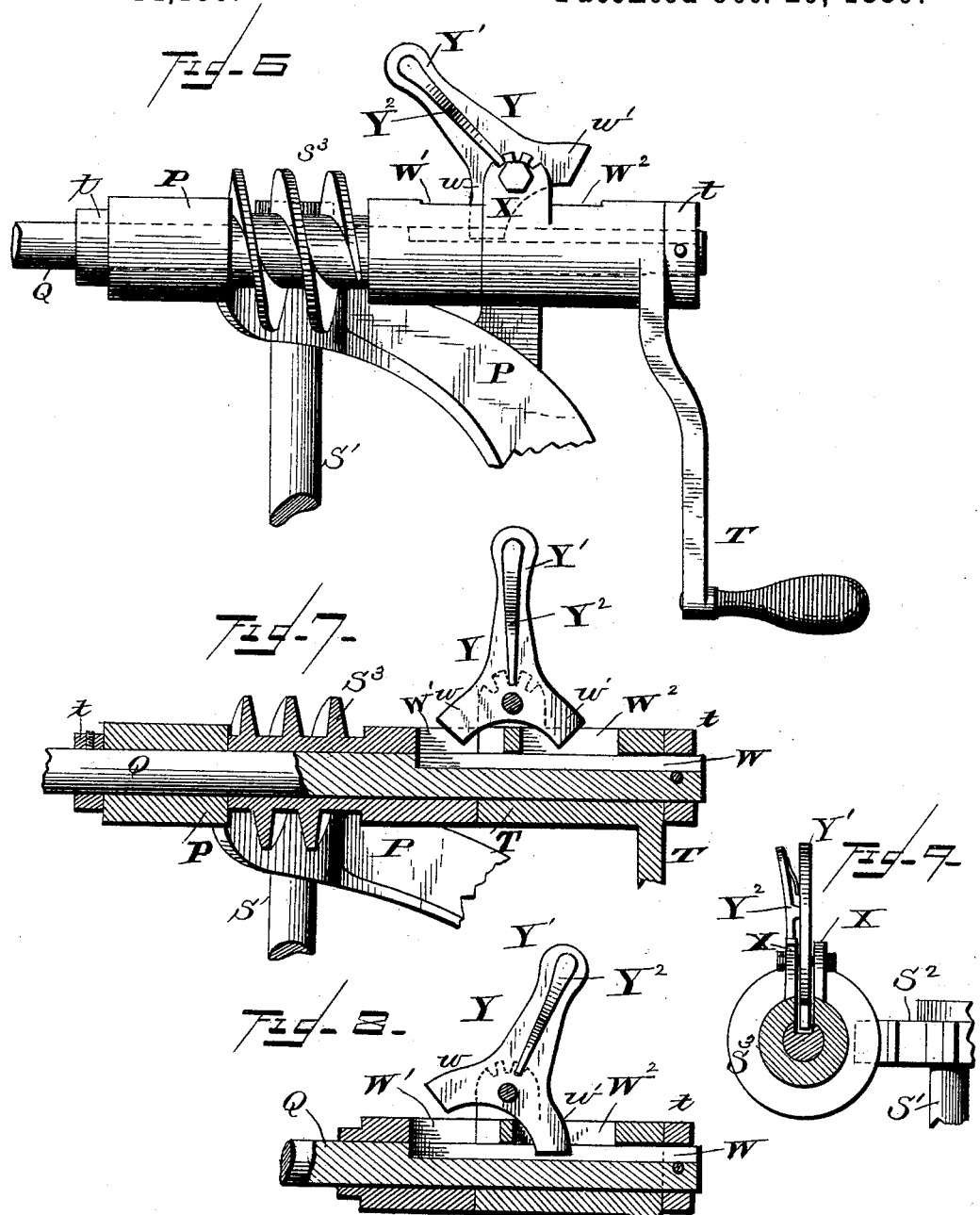
Witnesses.
F. L. Ourand
H. M. Sterling
Inventor.
Marion L. Nichols
by Alex Mahon
Attorney.

(No Model.) 7 Sheets—Sheet 7.
M. L. NICHOLS.
HARVESTER FRAME AND MEANS FOR RAISING AND LOWERING THE SAME.

No. 414,159. Patented Oct. 29, 1889.

WITNESSES
F. L. Ourand
W. A. Smith

INVENTOR
Marion L. Nichols
by Alex Mahon
Attorney

UNITED STATES PATENT OFFICE.

MARION L. NICHOLS, OF NEW YORK, N. Y.

HARVESTER-FRAME AND MEANS FOR RAISING AND LOWERING THE SAME.

SPECIFICATION forming part of Letters Patent No. 414,159, dated October 29, 1889.

Application filed February 7, 1889. Serial No. 299,052. (No model.)

*To all whom it may concern:*

Be it known that I, MARION L. NICHOLS, of New York, county of New York, State of New York, have invented new and useful Improvements in Harvester-Frames and Means for Raising and Lowering the Same, of which the following is a full and exact description, reference being had to the accompanying drawings, making part of this specification.

My invention relates to improvements in the manner of constructing and connecting the wheel-frames to the machine, and in the means for controlling the relation of the frame to said wheels either in the turning of the machine or in the adjustment of the cutters relatively to the ground.

The invention consists in connecting the master-wheel to the main frame outside said main frame by a pivotal connection, and in providing the master-wheel frame with a forwardly-extending reach to engage a trackway connected to the main frame, and in controlling the movements of said master-wheel through mechanism connected to the front-supporting-wheel holder, but disconnected from the master-wheel frame.

It further consists in a novel construction of front-supporting-wheel saddle and in the manner of connecting the same to the main frame, whereby the weight of said main frame shall be brought directly over the axle of said front supporting-wheel.

It further consists in connecting the arm which controls the movement of the rear or master wheel rigidly with the front-supporting-wheel holder, whereby the front wheel shall act either to hold or release the master-wheel to permit said wheel to change its relation to the main frame in turning the machine, or be held fixed when moving forward in a straight line.

It further consists in a novel construction of mechanism for controlling and regulating the height of the cutters to the ground, whereby the frame may be adjusted at each end simultaneously or either end independently of the other by means of a single operating-lever.

It further consists in certain details in the construction and arrangement of parts, all as hereinafter described and claimed.

Figure 2:
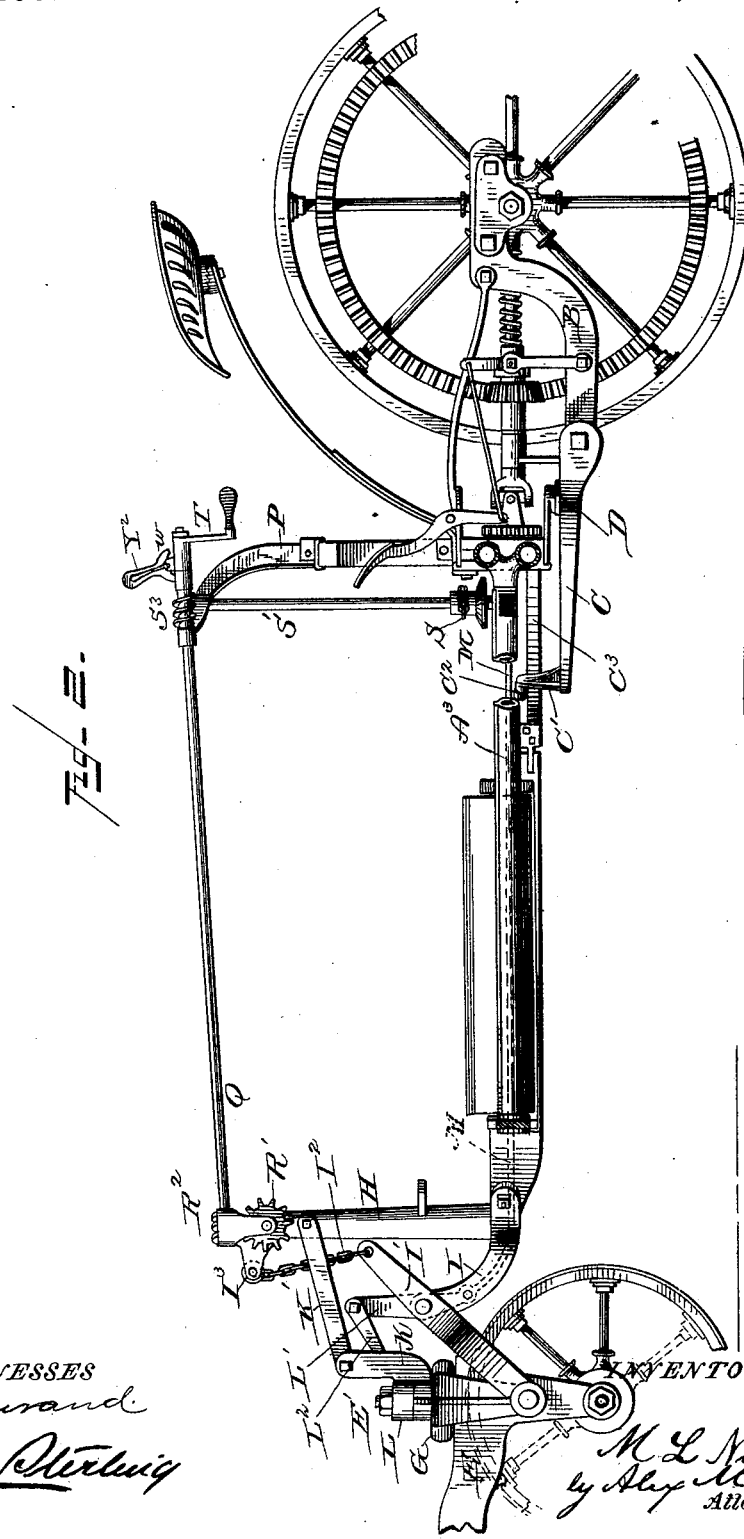
Figure 3:
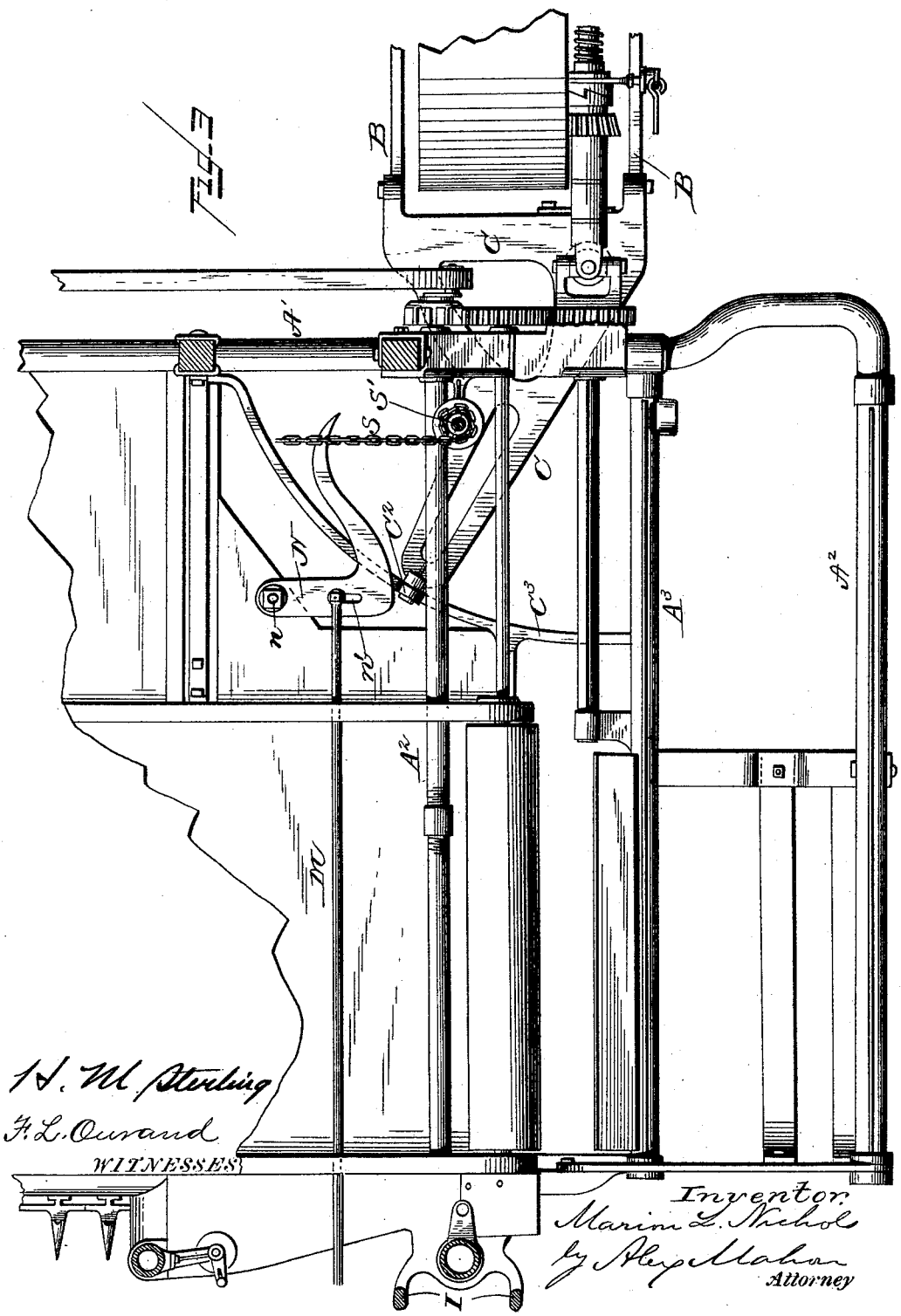
Figure 4:
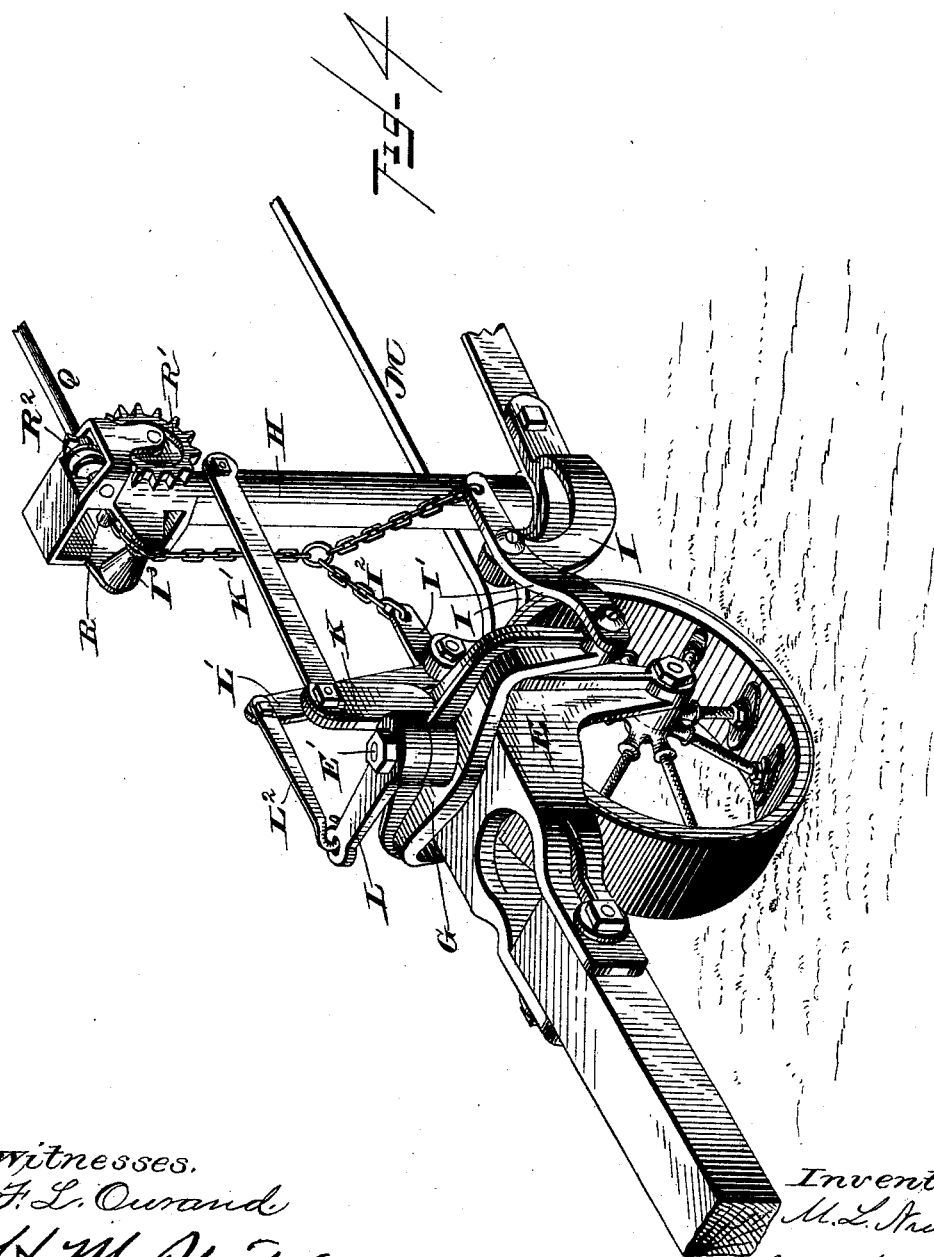
Figure 5:
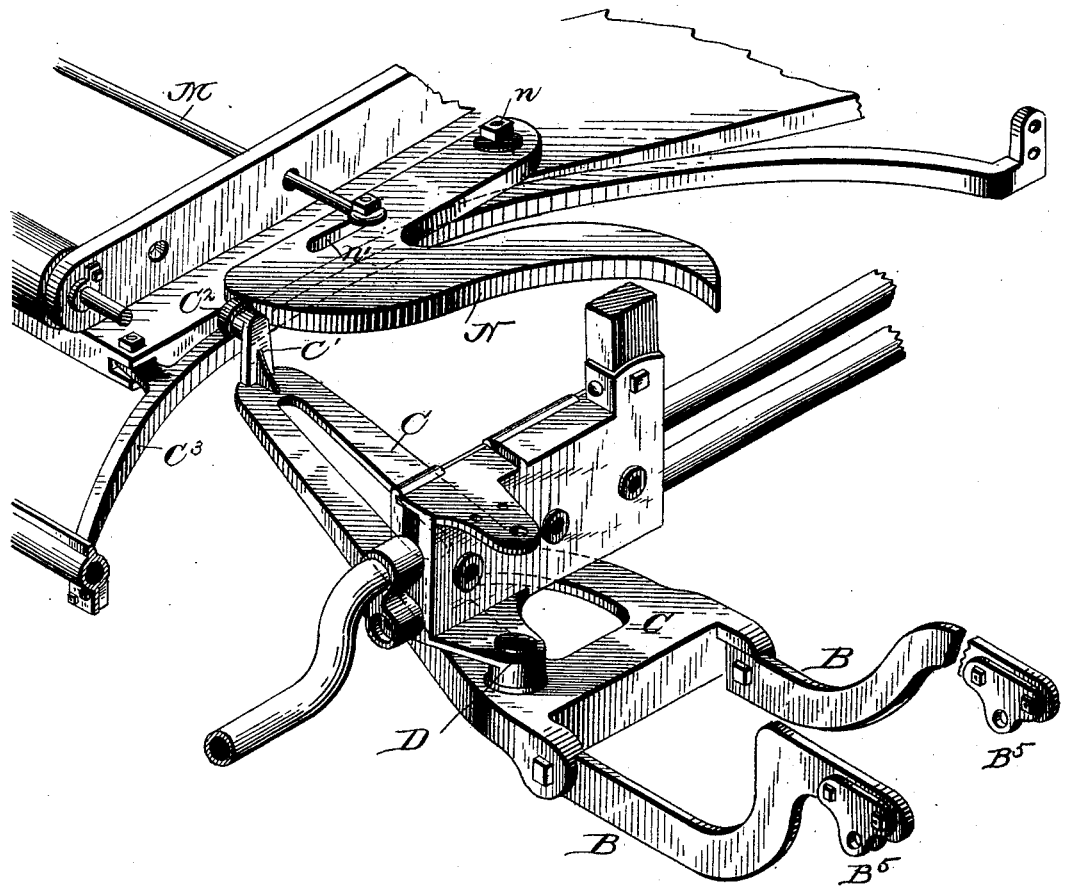
Figure 10:
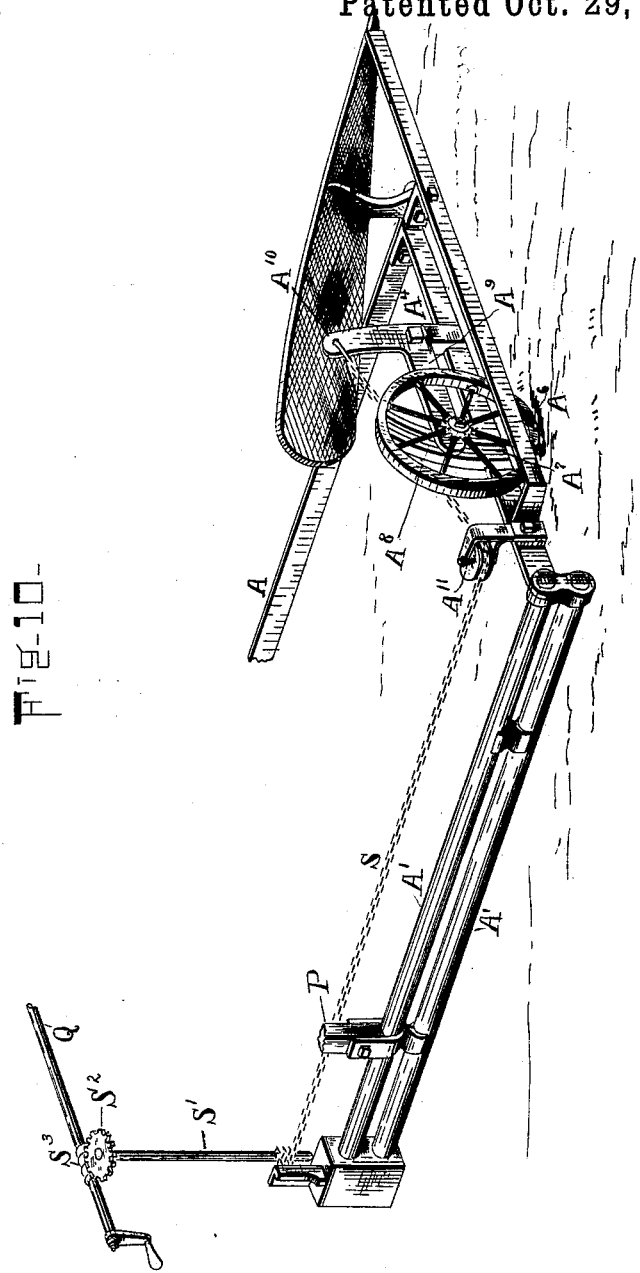

In the accompanying drawings, Figure 1 is a plan or top view of a harvesting-machine with the master-wheel removed, showing the means connected to the front-supporting-wheel holder for holding said master-wheel in proper relation to the main frame. Fig. 2 is a side view of the same with the master-wheel. Fig. 3 is an enlarged plan or top view similar to Fig. 1. The master-wheel is partially shown in position and the front wheel removed. Fig. 4 is a perspective view of the front supporting-wheel and its holder, showing the manner of connecting the same with its saddle and its saddle with the main frame. Fig. 5 is a skeleton perspective view of the rear sill of the machine and the master-wheel-supporting frame, and also the device by which the master-wheel is controlled in relation to the main frame. Figs. 6, 7, 8, and 9 are side, sectional, and end views of the devices for raising and lowering the frame. Fig. 10 is a perspective view taken from the rear of the machine, showing the manner of mounting and controlling the relation of the machine to the grain-wheel.

The machine to which my improvements are applied is known as a "low-down platform-binder," and in which the frame is mounted and supported upon and between three wheels, the master-wheel being located in rear of the main frame near the stubble side, the front supporting-wheel in front of the main frame and to one side of the cutters, and the grain-wheel at the outer or grain end of the platform, the grain being carried by the endless belt or carrier between the front and rear wheels. The main frame is preferably formed of gas-pipe or hollow tubing, and consists of the front and rear bars A A', the end bars $A^2$, intermediate cross-bar $A^3$, located between the bars $A^2$, and the end bar $A^4$, for supporting the grain-wheel; but said frame-bars, and also the other parts herein shown and not particularly described, and such parts of the machine as are not herein shown, may be constructed in any usual or preferred way.

The master-wheel-supporting frame consists of the side plates B, in which are formed or connected the bearings $B^5$ for the axle, and which plates are bolted to a forwardly-extending portion C, forming a reach, hereinafter referred to. This wheel-frame is connected to the main frame by a pivotal connection, as shown at D, in front of said master-wheel, with the forwardly-extending portion or reach C of the wheel-frame extending inward under the main frame at an angle, as shown, and this reach at its forward end is provided with an upwardly-extending lug C', in which is mounted a friction-wheel $C^2$, which engages with a segmental track $C^3$, secured to the main frame of the machine in any preferred way, and which trackway is formed in the arc of a circle of which the pivot D is the center, the angle to the arm or reach before referred to being such that when the master-wheel is parallel with the side bars $A^2$ of the frame said reach shall engage the track on a line slightly to one side of the wheel and on the opposite side of the wheel-frame to the pivotal point of connection of the wheel-frame to the main frame.

The front supporting-wheel is mounted in a holder E, with its two arms extending down on each side thereof, and in which arms are formed the bearings for the axle of the wheel. This wheel-holder also has the tongue connected thereto by a pivotal or loose connection, said pivot being arranged parallel with the wheel-axle. From the upper face of the holder E, and at a point directly over the axle, extends a pivot-pin E', rigidly connected to or formed with the holder, and through which said holder is pivotally connected with a saddle G, and through it with the main frame, in the following manner: Extending up from the main frame and upon each side of the post H, for supporting the lifting mechanism, are arms I, to which are pivoted levers I', the forward ends of which are mounted on journals projecting from the side faces of the depending arms of the saddle G, while the rear ends of said levers are connected through chains $I^2$ with the raising and lowering mechanism chain. A lug K extends up from the saddle G behind its point of connection with the wheel-frame, which lug is connected to the post H through a link K'.

By connecting the front supporting-wheel as hereinbefore described it will be readily seen that the weight supported by said wheel is brought directly over the axle, and that consequently said wheel is free to turn without cramping, and also that the relation of the cutters to the ground can be readily adjusted, and that, by connecting the saddle G to the post H through the link K', the perpendicular relation of the saddle to the wheel is maintained under the various adjustments of the cutting apparatus.

To the upper end of the pin E' is rigidly secured a lever L, which is connected with a lever L', mounted on the pivot-pin of one of the levers L' through a link $L^2$, the depending arm of the lever L' being in turn connected with a rod M, mounted in suitable guideways in the frame, and which rod extends to and is connected with a holding-dog N, arranged in such relation to the track supporting the forward end of the reach C of the master-wheel frame to engage and hold the end thereof, and consequently the master-wheel, in proper position, or in a right line of travel.

The dog N is preferably made in bell-crank form, pivoted at $n$ to the frame by the end of one of its arms, and connected to the rod M near its point of angle through a slot $n'$, formed in one arm of said dog. The other arm or holding-face of the dog is formed with a convex and concave operating-face, and by the engagement of which face with the friction-roller on the reach, to either hold the master-wheel in the right line of travel or to release and permit the master-wheel to swing or turn on its pivot in the turning of the front supporting-wheel, to permit said master-wheel to conform to the line of travel of said front supporting-wheel. It will thus be seen that while the master-wheel and front supporting-wheel are not connected and may be readily turned to cause the main frame to swing around upon the grain-wheel in turning the machine, when the machine is traveling forward the master-wheel is held in a fixed relation to the tongue and front supporting-wheel in a manner that will be readily understood. It will also be seen by the construction herein described that while the front supporting-wheel is free to turn entirely independently of the master-wheel it still controls the movement of said master-wheel, and that the free and independent movement allowed to said front supporting-wheel greatly facilitates the turning of the machine.

The grain-wheel $A^6$ is mounted on one arm $A^9$ of a bell-crank lever pivoted to a lug bolted to the bar $A^4$. A guideway $A^7$, having a slot $A^8$ formed therein in the arc of a circle of which the pivot of the bell-crank lever is the center, is also bolted to the bar $A^4$, and with which slot the axle of the grain-wheel engages, and by such engagement serving to hold the grain-wheel in proper position.

The shaft Q, by which the adjustment of the grain-wheel and the relation of the frame to the front supporting-wheel are controlled, is mounted or has its bearings in one end of the post H and its rear end supported in a bracket P near the driver's seat, mounted on the rear bar of the harvester-frame. The chain $I^2$ is connected to the levers I' at the front end, passing over a roller $I^3$, and being connected to a shaft R, mounted in the post H, and on which shaft is secured a worm-gear R', actuated by a worm $R^2$ on the shaft Q. The chain S is connected to the arm $A^{10}$ of the bell-crank lever, and passes therefrom around a guide-pulley $A^{11}$, and extends to and is connected to the lower end of a perpendicularly-arranged shaft S', upon the upper end of which is mounted a worm or gear $S^2$, engaged by and operated by a worm or gear S³ on the shaft Q, said shaft being operated by means of a crank T.

The construction of the parts by which the relation of the frame to the ground or the cutters to the ground is adjusted at both ends simultaneously or at either end independently is as follows: The shaft Q, at the end on which the crank is mounted, is grooved or slotted, as shown at W, and upon this end is loosely mounted a worm or gear S³, said worm or gear and the crank T being held from longitudinal displacement by means of washers t t. One end of the worm or gear S³ abuts against the bearing formed on the upper end of the bracket P, and the hub of the crank abuts against the hub of the worm or gear. The hub of the worm or gear S³, and also the hub of the crank T, are notched at their abutting ends, as shown at W' W², for a purpose hereinafter explained.

In suitable bearings X, formed with or connected to the hub of the crank, is mounted a rocking pawl Y, provided with a forked or bifurcated end having arms w w' extending out on each side of the pivot, said pawl being operated by means of a lever Y', forming a part thereof, to bring either one of the arms into engagement with the slots formed in the shaft Q, crank-hub T, or worm or gear-hub S³, the lever Y' being held in any of its adjusted positions by means of a spring-dog Y², pivotally mounted upon the lever Y' and adapted to engage notches formed in one of the bearings X.

The operation of the machine is as follows: The worm or gear S³ and crank being mounted loosely on the shaft Q, and the crank T carrying the engaging double pawl Y, when it is desired to raise both ends of the frame simultaneously, the rocking pawl is thrown forward so that the arm w shall engage the notch in the hub of the worm or gear S³, and also the notch in the shaft Q, by which it will be seen that the hub is locked to the shaft and the worm or gear S³ locked to the crank hub and shaft Q, and consequently by turning the crank the worm or gear S³, for controlling the adjustment of the grain-wheel, and the worm or gear R², to which the chain which controls the relation of the frame to the front wheel is connected, will be revolved simultaneously. When it is desired to only operate the worm or gear controlling the grain-wheel, the arm w is moved to only engage the hub of the worm or gear S³, in which case the crank and worm S² will turn freely on the shaft Q, which will remain stationary; but when it is desired to change the relation of the machine to the front supporting-wheel only, the pawl is thrown back so that the arm w' will engage the slot in the shaft Q, and the arm w will be thrown out of engagement with the hub of the worm or gear S³, by which it will be seen that the shaft and the worm R² at the front end will be revolved, while the worm or gear S³ will remain stationary.

The matter herein shown and described for controlling the relation of the front supporting-wheel to the frame and the relation of the frame to the ground is not broadly claimed herein, but is made the subject of a separate application filed February 12, 1889, Serial No. 299,597.

Having now described my invention, what I claim, and desire to secure by Letters Patent, is—

1. The combination of the master-wheel-supporting frame, the main frame, to which the same is connected by a pivotal connection, the master-wheel frame having a forwardly-extending reach engaging a trackway on the main frame, and mechanism connected to the front-supporting-wheel holder to engage the forwardly-extending reach on one side only of the pivotal connection of the main frame, substantially as and for the purpose set forth.

2. The combination, with the master-wheel frame supported at one end on a trackway on the main harvester-frame and carrying at the other the master-wheel and having a pivotal connection with the main frame between its support on the main frame and the axle of the master-wheel, of a locking device connected through arms and levers with the front-supporting-wheel holder and arranged to engage and lock the master-wheel frame in one direction only, substantially as described.

3. The combination of the front-supporting-wheel holder, a lever for controlling the movements of the master-wheel rigidly connected to said holder, a rod connected to said lever at one end and at its other to a dog, a dog mounted on the harvester-frame, and a master-wheel frame having a pivotal connection with the harvester-frame, and having a forward extension to be engaged by the dog, substantially as and for the purpose set forth.

4. The combination of the front-supporting-wheel frame, the lever rigidly connected therewith, the upright rocking lever, the link connecting these two levers, the rod connected to the rocking lever at one end and connected to a pivoted locking-dog at the other, and a laterally-swinging master-wheel frame pivoted to the machine-frame, and having a forwardly-extending reach to engage a trackway on the machine-frame and to be engaged by the dog, substantially as and for the purpose set forth.

5. The combination of the front-supporting-wheel holder, having the tongue pivoted thereto, a saddle with which the wheel-holder is pivotally connected, levers connecting the saddle with the main harvester-frame, and lifting-chains connected with said levers and the main frame, and the link connecting the saddle with the harvester-frame, substantially as described.

6. The combination of the shaft for controlling the height of the cutters in relation to the ground, a gear fixed thereto, a gear and crank loosely mounted thereon, and mechanism for connecting the crank either with the shaft or with the loose gear, or all together, substantially as described, whereby the frame may be adjusted at each end simultaneously or either end independently of the other by a single operating-lever, as set forth.

7. In a lifting device for controlling the height of cut in harvesting and binding machines, the combination of the operating-shaft carrying at one end a worm or gear fixed thereto and at its other a worm or gear and crank loosely mounted thereon, and said shaft having a groove formed therein at the end on which the crank is mounted, the crank-hub and gear or worm having their abutting ends notched, and a two-armed pawl pivoted on the hub of the crank and adapted by engaging the notch in the hub of the gear and grooved shaft either to lock the gear to the shaft or the crank to the gear, or all together, as set forth.

8. In harvesting and binding machines, the combination of the machine-frame, the front-supporting-wheel saddle, to which the front supporting-wheel is connected, the operating-shaft having a worm or gear rigidly secured to one end to control the movements of the frame in relation to the front wheel, a perpendicularly-arranged shaft, to which the chain controlling the movements of the grain-wheel is connected, having a gear mounted on its upper end, a worm or gear loosely mounted on the operating-shaft to engage the gear on the perpendicular shaft, a crank also loosely mounted on the operating-shaft adjacent to the loose gear, and a two-armed pawl pivoted on the hub of the crank, substantially as and for the purpose set forth.

In testimony whereof I have hereunto set my hand this 31st day of December, A. D. 1888.

MARION L. NICHOLS.

Witnesses:
  ALEX. MAHON,
  F. L. OURAND.